July 26, 1949.	E. GUILLET	2,477,125
SEMIRIMLESS SPECTACLE MOUNTING HAVING
AUXILIARY LENS CONNECTION MEMBER
Filed Nov. 29, 1946

INVENTOR.
EMIL GUILLET

BY Louis L. Gagnon
ATTORNEY

Patented July 26, 1949

2,477,125

UNITED STATES PATENT OFFICE 2,477,125

SEMIRIMLESS SPECTACLE MOUNTING HAVING AUXILIARY LENS CONNECTION MEMBER

Emil Guillet, Southbridge, Mass., assignor to American Optical Company, Southbridge, Mass., a voluntary association of Massachusetts Application November 29, 1946, Serial No. 712,794

2 Claims. (Cl. 88—41)

This invention relates to improvements in ophthalmic mountings of the semi-rimless type and has particular reference to an auxiliary lens connection member therefor.

A principal object of the invention is to provide an auxiliary lens connection member for a semi-rimless mounting of a well known construction, said mounting consisting of a bridge member and lens supporting means adjacent the nasal sides and having outwardly extending temple supports following the upper contour shape of the lenses.

Another object is to provide separable, easily applied auxiliary lens connection members which may be positioned at any desired location along the outwardly extending temple supports and which may be readily attached to the lens and said temple supports.

A further object of the invention is to provide a novel auxiliary lens connection member which when in assembled relation with the mounting will be substantially inconspicuous when viewed from the front.

Other objects and advantages of the invention will become apparent from the following description taken in connection with the accompanying drawings and it will be apparent that many changes may be made in the details of construction, arrangement of parts shown and described without departing from the spirit of the invention as expressed in the accompanying claims. I, therefore, do not wish to be limited to the exact details of construction, arrangement of parts shown and described as the preferred form only has been given by way of illustration.

Referring to the drawings.

Figure 1:
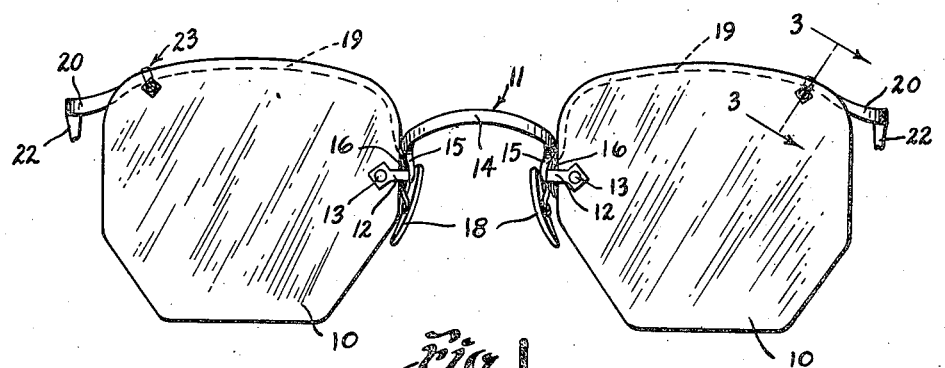
Fig. 1 is a front elevational view of the ophthalmic mounting embodying the invention.

With ophthalmic mountings of the type having long and slender temple supports shaped substantially to follow the upper contour shape of the lenses, some difficulty, in the past, has been encountered in retaining the temple supports in proper positional relation with the lenses. If formed of proper materials, however, this condition does not prevail and most of the difficulties of disalignment are obviated and result in a most desirable type of structure.

In instances, however, when difficulty was encountered in retaining the temple supports in proper relation with the lenses, means such as an integral lens strap member or other connecting means were provided for connecting the lenses with the supports adjacent the temporal ends thereof.

In instances when the connection means were made as an integral part of the structure a wide variety of sizes was required to accommodate for the different sizes of lenses. This required the dispensers to carry a complete stock of mountings of said various sizes in order to meet the customers' requirements. This not only introduced problems of inventory but some difficulty was encountered in properly assembling the supporting structure with the lenses particularly that of properly locating the positions of the connection openings in the lenses so that they properly align with the openings in the connecting means when assembled with the lenses. If the connection openings are a little out of line and the lens supporting structure is connected with the lenses with this condition existing, the said lenses would be subjected to strain with the danger of breakage or chipping of the lenses during the mounting thereof or during subsequent use.

One of the prime objects of the present invention, therefore, is to overcome the above difficulties by providing holding means which may be connected with the lenses separately of the temple supports and which has a portion shaped to engage the temple support and retain it in desired positional relation with the adjacent contour shape of the lens and which will be of such nature as to readily compensate for any off-position of the connection openings and which is free to move in a direction longitudinally of the temple support to relieve the lens from distortional strain.

Referring more particularly to the drawings wherein like characters of reference designate the parts throughout the several views, the device embodying the invention comprises broadly of a pair of lenses 10 connected to a bridge member 11 by suitable lens straps 12. The lens straps 12 are provided with openings aligned with openings in the lenses through which the screws 13 or other suitable connection means may be positioned to secure the lenses to the straps.

The bridge member 11, as shown in the drawings, is provided with a central arch portion 14 and depending side portions 15 which are secured by solder or the like to the lens straps 12. It is to be understood that in the present invention any shape or style bridge may be used and that the one shown is by way of illustration only.

The lens straps 12 are provided with a plurality of blade springs or the like 16 interposed between the inner surfaces of the edge portions of the straps and the adjacent edges of the lenses and are adapted to limit the pivotal movement of the lens straps relative to the lenses to relieve shock and strain at the nasal sides thereof.

Nose pad supporting arms 17 are secured to the lens straps 12 and are adapted to extend rearwardly and downwardly and terminate in nose pad connection ends to which the nose pads 18 are connected.

Figures 2, 3, 4:
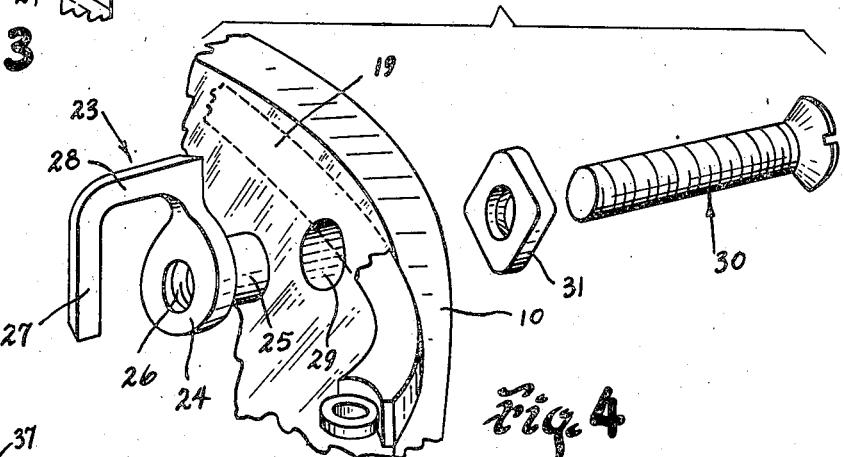
Fig. 2 is a top plan view of a portion of the mounting shown in Fig. 1.
Fig. 3 is a sectional view as taken on lines 3—3 of Fig. 1 showing the auxiliary lens connection member in assembled relation to the lens and the temple support.
Fig. 4 is an exploded view of the auxiliary lens connection member and portions of the lens and temple supporting arm.

The long and slender temple supporting arms 19 are shaped substantially to follow the contour shape of the upper edges of the lenses and are preferably adapted to lie in the rear of the plane of said lenses, as illustrated in Fig. 2. The said temple supporting arms in this instance are secured to the rear of the lens straps 12 and to the adjacent sides of the nose pad arms 17 by soldering, welding or the like and are provided adjacent their opposite ends with outwardly and rearwardly extending endpiece portions 20 having pivotal connections 21 with the temples 22.

The auxiliary lens connection member 23 which is adapted to secure the temple supporting arms 19 in aligned relation with the lenses 10 comprises a U-shaped member having a flattened circular lens contacting portion 24 on one of the legs thereof. Formed integrally with the flattened portion 24 and extending outwardly from the lens contacting surface is a central stud or post 25 provided with a threaded bore 26 extending axially through the said post or stud 25 and the flattened portion 24. The opposed leg 27 of the U-shaped member and the joining portion 28 are adapted to be in alignment with the center of the threaded bore 26 of the flattened portion 24 with the leg 27 spaced a sufficient amount from the portion 24 to allow the temple support 19 to be positioned therebetween.

In assembling the auxiliary member 23 to the lenses and the temple supporting arms, it is first necessary to form an opening 29 in the lenses. This opening may be positioned at any desired location along the upper contour of the lenses. The post or stud 25 is then positioned within the opening 29 with the temple supporting arm 19 lying within the opposed legs of the U-shaped member. The U-shaped member is then secured to the lens by the screw 30 which is adapted to extend through the washer 31 from the opposed side of the lens and into threaded connection with the stud or post 25. The screw 30 is adapted to be of sufficient length to extend through the washer 31, the lens 10 and the post 25 and across the open end of the U thereby confining the temple supporting arm within the said U-shaped member. The lenses may vary in thickness at the point of connection and in some instances the screw 30 will be longer than necessary and will contact the opposed side of the U before the connection is tightened to said lens. In instances of this nature, the leg 27 of the U-shaped member may be urged outwardly a sufficient amount through its inherent resiliency to allow the screw to be tightened.

It will be seen that with a construction of this nature wherein the connection members are formed as separate units, that they may be positioned at any desired location along the upper contour of the lens and may be moved along the temple supporting arms to position the post in alignment with and seat within the opening in the lens. This will obviate the necessity of accurate truing with pliers or the like of the temple supporting arms or lens ear and will provide an auxiliary connection member which may be quickly and easily attached to any of the well known structures of this nature.

Figure 5:
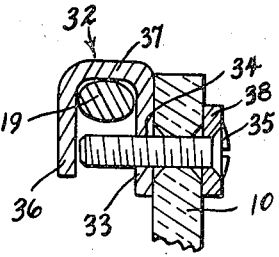
Fig. 5 is a sectional view similar to Fig. 3 showing a modified form of the auxiliary lens connection member.

Fig. 5 shows a modified form of the invention comprising a U-shaped member 32 having a flattened circular lens contacting portion 33 forming one of the legs of the U, and which is provided with a threaded opening 34 for receiving the screw 35. The opposed leg 36 of the U-shaped member and the joining portion 37 are adapted to be centrally aligned with the threaded opening in the lens contacting portion 33 with the leg 36 spaced from the portion 33 a sufficient amount to provide space to receive the temple supporting arm 19. If desired, a washer 38 may be positioned between the head of the screw 35 and the lens on the opposed side surface.

From the foregoing description, it will be seen that the applicant has provided simple, efficient and economical means of accomplishing all the objects and advantages of the invention, particularly that of providing an auxiliary lens connecting member which may be quickly and easily attached to a semi-rimless mounting of a well known construction.

Having described my invention, I claim:

1. In a semi-rimless type ophthalmic mounting embodying a bridge member having lenses secured on the opposed sides thereof and having long and slender temple supporting arms extending outwardly therefrom and following the upper contour of said lenses, a temporally disposed lens connection member for detachably securing each of said arms to a respective lens, said lens connection members each comprising an inverted U-shaped member of relatively rigid material having its bight portion overlying the adjacent portion of the temple supporting arm, with one of its depending legs disposed adjacent the surface of the lens and its other leg depending in spaced relation thereto, said first leg terminating in an enlarged end portion having a threaded opening disposed in substantial alignment with an aperture formed in the lens, said other leg being spaced from the first leg a distance equal to at least the lateral cross sectional dimension of the temple supporting arm portion, and a securing member provided with an enlarged portion shaped to overlie the opposed side surface of the lens and having a longitudinal portion extending from said enlarged portion through the aligned aperture in the lens, said longitudinal portion being threadedly connected in said threaded opening in the enlarged end of said first leg and with its end so located with respect to the other leg as to close the space between said leg and the enlarged end so as to be less than the lateral cross-sectional dimension of the temple supporting arm portion whereby said arm portion will be retained within the bight portion of said U-shaped member.

2. A lens connection member for use with a semi-rimless type ophthalmic mounting having long and slender temple supporting arms following the adjacent upper contour of the lenses of the mounting, said lens connection member being adapted for detachably securing each of said arms to the temporal portion of a respective lens and comprising an inverted U-shaped member of relatively rigid material having its bight portion shaped to overlie the adjacent portion of the temple supporting arm, with one of its depending legs terminating in an enlarged end portion having a threaded opening adapted to be positioned in substantial alignment with an aperture formed in the lens, the other leg of said member depending in spaced relation to said first leg and terminating in a fixed abutment end portion disposed in substantial alignment with said threaded opening in the enlarged end portion of said first leg and spaced therefrom a distance equal to at least the lateral dimension of the temple supporting arm, and a securing member having a cap portion adapted to be positioned on the opposed side surface of the lens when the connection member is assembled therewith and having a longitudinal portion extending from said cap portion and adapted to be positioned through the aligned aperture in the lens and opening in the enlarged end portion of said first leg, and of length such that its end will substantially abut the solid abutment end portion of the other leg when assembled with a lens and said longitudinal portion having thread means thereon for threadedly connecting said securing member with the enlarged end of said first leg.

EMIL GUILLET.

REFERENCES CITED

The following references are of record in the file of this patent:

UNITED STATES PATENTS

| Number | Name | Date |
|---|---|---|
| 2,238,556 | Durgin | Apr. 15, 1941 |
| 2,241,894 | Vitolo | May 13, 1941 |
| 2,243,681 | Pomeranz | May 27, 1941 |